(12) United States Patent
Guez et al.

(10) Patent No.: US 6,200,375 B1
(45) Date of Patent: Mar. 13, 2001

(54) TITANIUM DIOXIDE, PREPARATION AND USE

(75) Inventors: Anny Guez; Caroline Steiner, both of Paris (FR)

(73) Assignee: Millennium Inorganic Chemicals, S.A., Courbevoie Cedex (FR)

( * ) Notice: Subject to any disclaimer, the term of this patent is extended or adjusted under 35 U.S.C. 154(b) by 0 days.

(21) Appl. No.: 09/355,259

(22) PCT Filed: Jan. 20, 1998

(86) PCT No.: PCT/FR98/00103

§ 371 Date: Jul. 26, 1999

§ 102(e) Date: Jul. 26, 1999

(87) PCT Pub. No.: WO98/32803

PCT Pub. Date: Jul. 30, 1998

(30) Foreign Application Priority Data

Jan. 27, 1997 (FR) .................................................. 97 00821

(51) Int. Cl.$^7$ ................................ C04B 1/14; B05D 7/00
(52) U.S. Cl. ........................... 106/438; 106/442; 106/443; 106/446; 427/214; 427/215
(58) Field of Search ..................................... 106/438, 442, 106/443, 446; 428/404; 427/214, 215

(56) References Cited

U.S. PATENT DOCUMENTS

| | | | | |
|---|---|---|---|---|
| 3,767,455 | * | 10/1973 | Claridge et al. ...................... | 106/438 |
| 3,942,999 | * | 3/1976 | Hinley et al. ......................... | 106/438 |
| 4,759,800 | * | 7/1988 | Luginsland et al. .................. | 106/438 |
| 5,203,916 | * | 4/1993 | Green et al. .......................... | 106/438 |
| 5,650,002 | * | 7/1997 | Bolt ....................................... | 106/438 |
| 5,792,250 | * | 8/1998 | Braun et al. .......................... | 106/438 |

FOREIGN PATENT DOCUMENTS

| | | |
|---|---|---|
| 0078632 | 5/1983 | (EP) . |
| 0078633 | 5/1983 | (EP) . |
| 62-185761 | 8/1987 | (JP) . |
| 02194963 | 7/1990 | (JP) . |

* cited by examiner

Primary Examiner—Mark L. Bell
Assistant Examiner—Veronica F. Faison
(74) Attorney, Agent, or Firm—Kalow & Springut LLP

(57) ABSTRACT

The invention concerns a novel titania pigment useful for external painting. This pigment has a titania nucleus coated successively with a layer of zirconium hydroxide or oxyhydroxide, then a layer of titanium hydroxide or oxyhydroxide, then of a layer of co-precipitated phosphate and silica, and finally a layer of aluinium oxyhydroxide. The invention also concerns a method for preparing said pigment and its use in paints, plastics and laminated paper.

16 Claims, No Drawings

TITANIUM DIOXIDE, PREPARATION AND USE

The present invention concerns a titanium dioxide pigment that presents a surface treatment adapted for use in high quality exterior paints.

Titanium dioxide is used in paint compounds because of its pigment properties.

Titanium dioxide pigments are generally treated with mineral compounds to improve their application properties such as dispersibility, whiteness, and coverage power.

These treatments also make it possible to improve the quality of titanium dioxide based paints over time while retaining the original physicochemical characteristics of the paint despite its outdoor exposure, specifically its gloss, color stability, and the mechanical properties of the film.

In addition to its pigment function, titanium dioxide pigment is known for its absorption of UV rays. It protects the organic matrix into which it is introduced (paints, plastics) against surface degradation from the effect of rays of this type.

At the same time, titanium dioxide contains photocatalytic properties that degrade the existing organic compounds when they are exposed to the effect of those same UV rays. This degradation is characterized by chalking of the paint.

Mineral processes are also designed to avoid direct contact between the titanium dioxide and the organic components of the matrix. To this end, it is known to use a silica and/or aluminum based mineral treatment. However, it has been observed that such surface treatments were insufficient when the pigment was used in paint compounds for exterior coats with strong exposure to sunlight.

A goal of the present invention is to present a titanium dioxide pigment that has a mineral surface treatment which exhibits good behavior in exterior paints over time, most particularly in terms of low chalking and good gloss retention.

To this end, the invention concerns a titanium dioxide pigment containing a titanium dioxide core covered sequentially with a layer of zirconium hydroxide or oxyhydroxide, then a layer of titanium hydroxide or oxyhydroxide, then a layer of a phosphate and silica coprecipitate, followed by a layer of aluminum oxyhydroxide.

The invention also concerns a process for the preparation of this pigment consisting of the following operations:
  an aqueous suspension of titanium dioxide pigments if formed,
  in a first step, a layer of zirconium hydroxide or oxyhydroxide is precipitated on the surface of the pigment;
  in a second step, a layer of titanium hydroxide or oxyhydroxide is precipitated on the surface of the pigment;
  in a third step, a layer of phosphate and silica are coprecipitated on the surface of the pigment;
  in a fourth step, a layer of aluminum oxyhydroxide is precipitated on the surface of the pigment;
  the pigment is recovered from the suspension.

Lastly, the invention concerns the use of this pigment in paints and plastics.

Other details and advantages of the invention will become more obvious to the reader as the description and examples are read.

The invention thus concerns a titanium dioxide pigment containing a titanium dioxide core, covered sequentially with a layer of zirconium hydroxide or oxyhydroxide followed by a layer of titanium hydroxide or oxyhydroxide, then a layer of a phosphate and silica coprecipitate, and finally a layer of aluminum oxyhydroxide.

For the entire description, the different layers covering the titanium dioxide present a general thickness of between 50 and 100 Å. These layers can be discontinuous, surrounding the titanium dioxide more or less evenly.

The pigment according to the invention is routinely covered with:
  0.5 to 1.5 wt-% zirconium hydroxide or oxyhydroxide, expressed as $ZrO_2$,
  0.05 to 1 wt-% titanium hydroxide or oxyhydroxide, expressed as $TiO_2$,
  0.2 to 1.5 wt-% phosphate, expressed as $P_2O_5$,
  0.2 to 1.5 wt-% silica, expressed as $SiO_2$,
  2 to 4 wt-% aluminum oxyhydroxide, expressed as $Al_2O_3$,
  the percentages being expressed as wt-% in ratio to the titanium dioxide core.

The invention also concerns a process for treating the surface of this titanium dioxide pigment. The process includes the following steps:
  an aqueous suspension of titanium dioxide pigments is formed;
  in a first step, a layer of zirconium hydroxide or oxyhydroxide is precipitated on the surface of the pigment;
  in a second step, a layer of titanium hydroxide or oxyhydroxide is precipitated on the surface of the pigment;
  in a third step, a layer of a phosphate and silica are coprecipitated on the surface of the pigment;
  in a fourth step, a layer of aluminum oxyhydroxide is precipitated on the surface of the pigment;
  the pigment is recovered from the suspension.

The process, then, consists of forming an initial layer of zirconium hydroxide or oxyhydroxide or oxyhydroxide directly on the surface of the pigment, followed by a second layer of titanium hydroxide or oxyhydroxide, then a third layer that is a phosphate or silica coprecipitate, and lastly a layer of aluminum oxyhydroxide.

According to the invention procedure, one starts with an aqueous suspension of titanium dioxide pigments containing titanium dioxide, the majority of which are preferably in rutile form. This suspension may be formed by any method known in the profession, as for example sulfate or chlorine processes.

The concentration of titanium dioxide pigments in this suspension varies routinely between 100 and 500 g/l.

This dispersion may possible contain a dispersant in order to disperse and stabilize it. It can be obtained specifically by grinding a titanium dioxide dispersion with the aid of the said dispersant. The dispersant may be selected from among the following: amino 2-methyl 2-propanol 1; potassium or sodium tetrapyrophosphate; potassium or sodium hexametaphosphate; polymer alkaline salts; or polyacrylic acid copolymers such as ammonium salts or polyacrylic acid sodium. In the event dispersants with a phosphate base are used, they may be present generally in a concentration of 0.1 to 0.5 wt-% in ratio to the titanium dioxide weight, expressed as $P_5O_5$.

The surface treatment process is generally performed at a temperature greater than 60° C. This temperature is maintained for the entire process, but one may also simply raise the temperature of the original dispersion above 80° C. then continue the treatment without a heat source.

The first treatment step consists of depositing a layer of zirconium hydroxide or oxyhydroxide onto the surface of the pigment through precipitation.

During this first step, a layer of zirconium hydroxide or oxyhydroxide is routinely precipitated from a compound that can be hydrolyzed from zirconium chosen from among zirconium sulfate, zirconium orthosulfate, zirconium chloride, or zirconium oxychloride.

The amount of hydrolyzable zirconium compound introduced during this first step is generally between 0.5 and 1.5 wt-% in ratio to the titanium dioxide core to be treated, expressed as $ZrO_2$, and preferably between 0.2 and 1.5%.

The second treatment step consists of depositing a layer of titanium hydroxide or oxyhydroxide onto the surface of the pigment of precipitation.

During this second step, a layer of titanium hydroxide or oxyhydroxide is routinely precipitated from a compound that can be hydrolyzed from titanium chosen from among titanium chloride, titanium oxychloride, or titanium sulfate.

The amount of hydrolyzable titanium compound introduced during the second step generally comprises between 0.05 and 1 wt-% in ratio to the titanium dioxide core to be treated, expressed as $TiO_2$.

To obtain precipitation of hydroxides, the first two steps are performed at a pH routinely between 4 and 6, preferably 5. The pH can generally be controlled by the addition of an acid and/or a base such as sulfuric acid, hydrochloric acid or acetic acid, and soda or potassium.

The third processing step consists of depositing a layer of a phosphate and silica coprecipitate onto the surface of the pigment by precipitation.

During this third step, a layer of a phosphate and silica coprecipitates are routinely precipitated from compounds that can be hydrolyzed from phosphorus and silicium chosen from among:

phosphoric acid, phosphates such as potassium or sodium tetra pyrophosphate, potassium or sodium hexametaphosphate, potassium or sodium tripolyphosphate, sodium dihydrogenaphosphate;

sodium or potassium silicates;

The amount of hydrolyzable phosphorous compound introduced during this step is generally between 0.2 and 1.5 wt-% in ratio to the titanium dioxide core to be treated, expressed as $P_2O_5$. The hydrolyzable silicium compound is generally between 0.2 and 1.5 wt-% in ratio to the titanium dioxide core to be processes, expressed as $SiO_2$.

To obtain precipitation of the phosphate and silica coprecipitate, this step is routinely carried out at a pH between 6 and 9. The pH can be controlled by added phosphoric acid and/or another acid such as sulfuric acid or hydrochloric acid. The pH can also be controlled by introducing the phosphorus based and the silicium based compounds that are going to form the coprecipitate simultaneously and/or alternately. That is the case, for example, when phosphoric acid and sodium silicate are used during coprecipitation.

The amounts of phosphorus and silicium compounds introduced are adjusted in order to precipitate a layer of coprecipitate providing a P/Si atomic ratio of between 0.3 and 3, preferably between 0.6 and 1.2.

If a dispersant with a phosphate base was used to stabilize the starting dispersion of titanium dioxide pigment, the amount of phosphate contributed by the dispersant to the amount of phosphate introduced during the third precipitation step will be reduced.

It is advantageous to introduce the phosphorus compound then the silicium compound sequentially into the aqueous dispersion of titanium dioxide pigment.

The fourth step consists of depositing an aluminum layer.

Here and for the description, an aluminum layer means an aluminium oxyhydroxide precipitate.

One routinely precipitates this last layer from a hydrolyzable aluminium compound such as basic hydroxylated salts, and in particular one may selected sodium aluminate, basic aluminium chloride, or aluminium diacetate hydroxide. Aluminum sulfate may also be used.

The amount of hydrolyzable aluminum compound introduced during this step is routinely between 1 and 5 wt-% of $Al_2O_3$, in ratio to the weight of the titanium dioxide core to be processed, and preferably between 2% and 4%.

This precipitation is carried out at the pH necessary for precipitation of the aluminum layer. This pH may be between 3 and 10. Preferably, the pH will be between 5 and 10. It may be controlled by the addition of sulfuric acid.

After each precipitation step, ripening may be performed. This consists of stirring the reactional mixture after introduction of the hydrolyzable compounds that enable precipitation.

Preferably, ripening time is from 5 to 30 min. at each step.

Following the precipitation steps, the pigments are separated from the liquid phase of the suspension using any known method, such as filtration for example.

Then the pigment is generally washed in water, dried, and micronized.

The pigments according to the invention can also be processed with organic compounds to control properties specific to their use such as gloss, dispersibility, wetting, and stabilization. These organic compounds may be chosen from among liquid or solid polyhydric alcohols such as polyglycols with low molecular mass, ethoxylated or not; trimethylol propane (TMP); trimethylol ethane (TME); ethoxylated trimethylol propane; liquid polyphosphates; hydroxyamines such as triethanolamine (TEA); 2-amino-2-methyl-1-propanol (AMP); or even silicone based products.

This organic process may be carried out in aqueous phase following the fourth precipitation step, or after the pigments are dried.

The invention concerns the use of pigments according to the invention in coating compounds, especially paints, and in plastic compounds for which the pigment according to the invention prevents bluing over time.

The pigments according to the invention may also be used in paper laminates.

The following examples are illustrative of the invention but do not limit its scope.

EXAMPLES

Preparation of a pigment according to the invention

A titanium dioxide suspension concentrated to 900 g/l is introduced, ground under 0.2 wt-% amino methyl propanol (AMP90), in ratio to titanium dioxide weight, then diluted to 350 g/l.

It is heated to a temperature of approximately 80° C., then heating is discontinued.

First Layer

The dispersion's pH is adjusted to 5 by adding sulfuric acid.

To the dispersion is added 1.1 wt-% $ZrO_2$, in ratio to the weight of the titanium dioxide to be treated, in the form of a zirconium sulfate acid solution.

Said addition takes place over 7 minutes. The pH is controlled during addition by adding soda at between 4.8 and 5.2.

The reactional mixture is subsequently stirred for 10 min.

Second Layer

To the above mixture is added 0.15 wt-% $TiO_2$, in ratio to the weight of the titanium dioxide to be treated, in the form of a titanium oxychloride solution.

Said addition takes place over 5 minutes, during which the pH is held between 4.8 and 5.2 by the addition of soda.

The reactional mixture is subsequently stirred for 15 min.

Third Layer

To the above reactional mixture is added:

0.4 wt-% $P_2O_5$, in ratio to the titanium dioxide to be treated, in the form of a sodium hexametaphosphate solution;

0.7 wt-% $SiO_2$, in ratio to the titanium dioxide to be treated, in the form of a sodium silicate solution.

Said additions take place over 10 minutes, during which the pH is held between 7.8 and 8.2 by the addition of sulfuric acid.

The reactional mixture is subsequently stirred for 10 min.

Fourth Layer

The pH is adjusted to 9.5 with the soda.

To the above reactional medium is added 3.1 wt-% $Al_2O_3$, in ratio to the titanium dioxide to be treated, in the form of a sodium aluminate solution.

Said addition takes place over 10 minutes, during which the pH is held between 9.3 and 9.7 by adding sulfuric acid.

The reactional mixture is subsequently stirred for 30 min.

The dispersion is then filtered.

The titanium dioxide pigments obtained are washed with water at 45° C., then dried at 150° C. for 15 hours.

They are then surface treated with trimethylol propane at a rate of 0.5 wt-% in ratio to the weight of the titanium dioxide to be treated.

Comparative Pigments

Three commercial pigments are used presenting the following characteristics:

Comparative pigment 1: titanium dioxide pigment covered with a surface treatment having a base of 2.8 wt-% $Al_2O_3$ and 0.8 wt-% $ZrO_2$.

Comparative pigment 2: titanium dioxide pigment covered with a surface treatment having a base of 3.5 wt-% $Al_2O_3$, 0.6 wt-% $ZrO_2$, and 0.6 wt-% $P_2O_5$.

Comparative pigment 3: titanium dioxide pigment covered with a surface treatment having a base of 2.2 wt-% $Al_2O_3$ and 5 wt-% $SiO_2$.

Tests and Results

The pigments were tested in a formula for exterior paints.

Preparation of the paints

Four paints having a pigment base as described above were prepared.

The paint had a base of an alkyd and melamine binder in a 70/30 ratio by weight. The amount of pigment was approximately 37 wt-%.

Said paints were applied to an aluminum base to measure chalking or to a glass to measure gloss, in a thickness of between 40 and 90 µm. They were pre-dried for 30 min., then cooked for 130° C. for 30 min.

Accelerated aging

The aluminum bases coated with paint were placed into a QUVB accelerated aging device. The aging cycle was as follows:

4 hours of UV at a temperature of 60° C., then 4 hours under moisture at a temperature of 50° C.

Measurements

In terms of aging, the different coated bases were measured for:

gloss at 20° C. using a gloss meter,

Helmen chalking on aluminum bases. To measure Helmen chalking, adhesive tape was stuck to a part of the surface of the aged base, then removed from it. The optical density of the adhesive tape that was applied to the aged paint and that took away with it a portion of the chalking was then measured. The chalking measurement corresponded to the percentage ratio of the optical density of that measured for the clean adhesive tape before adherence. The higher the number, the greater the chalking rate.

Results

Paint chalking reached a saturation value of 80%:

at the end of 1000 QUVB cycles for the pigment according to the invention;

at the end of 875 QUVB cycles for comparative pigment 1;

at the end of 585 QUVB cycles for comparative pigment 2;

at the end of 875 QUVB cycles for comparative pigment 3.

After 120 aging cycles, the paint's gloss was:

66 for the pigment according to the invention;

60 for the comparative pigment 1;

66 for the comparative pigment 2;

62 for the comparative pigment 3.

It was observed that the specific mineral treatment formula according to the invention assures the paint of a slower appearance of chalking, and gloss retention at least as high as that of the comparative treatments.

What is claimed is:

1. A titanium dioxide pigment comprising a core of titanium dioxide covered sequentially with a layer of zirconium hydroxide or oxyhydroxide, a layer of titanium hydroxide or oxyhydroxide, a layer of a phosphate and silica coprecipitate, and a layer of aluminum oxyhydroxide.

2. The pigment of claim 1, wherein the pigment is coated with:

0.5 to 1.5 wt-% zirconium hydroxide or oxyhydroxide, expressed as $ZrO_2$, 0.05 to 1 wt-% titanium hydroxide or oxyhydroxide, expressed as $TiO_2$, 0.2 to 1.5 wt-% phosphate, expressed as $P_2O_5$, 0.2 to 1.5 wt-% silica, expressed as $SiO_2$, 2 to 4 wt-% aluminum oxyhydroxide, expressed as $Al_2O_3$, said percentages being expressed by weight in ratio to the titanium dioxide.

3. A process for treating the surface of a titanium dioxide pigment comprising the steps of:

forming an aqueous suspension of titanium dioxide pigment, in a first step, precipitating a layer of zirconium hydroxide or oxyhydroxide on the surface of the pigment, in a second step, precipitating a layer of titanium hydroxide or oxyhydroxide on the surface of the pigment, in a third step, precipitating a layer of phosphate and silica coprecipitates on the surface of the pigment, in a fourth step, precipitating a layer of aluminum oxyhydroxide on the surface of the pigment, recovering the pigment from the suspension.

4. The process of claim 3 wherein the treatment is carried out at a temperature greater than 60° C.

5. the process according to either claim 3 or claim 4, wherein the zirconium hydroxide is a hydrolyzable zirconium compound selected from the group consisting of zirconium sulfate, zizrconium orthosulfate, zirconium chloride, and zirconium oxychloride.

6. The process according to claim 3, wherein the first step precipitates between 0.5 and 1.5 wt-% of a hydrolyzable zirconium compound, expressed as $ZrO_2$, in ratio to the titanium dioxide core.

7. The process according to claim 3, wherein the second step precipitates a layer of titanium hydroxide or oxyhydroxide from a hydrolyzable titanium compound selected from the group consisting of titanium chloride, titanium oxychloride, and titanium sulfate.

8. The process according to claim 3, wherein the second step precipitates between 0.05 and 1 wt-% of a hydrolyzable titanium compound in ratio to the titanium dioxide core, expressed as $TiO_2$.

9. The process according to claim 3, wherein the first step and the second step are precipitated at a pH of between about 4 and 6.

10. The process according to claim 3, wherein the third step precipitates a layer of phosphate and silica coprecipitates from hydrolyzable phosphorous selected from the group consisting of phosphoric acid, potassium tetrapyrophosphate, sodium tetrapyrophosphate, potassium hexametaohosphate, sodium hexametaphosphate, potassium tripolyphosphate, sodium tripolyphosphate and sodium dihydrogenophosphate and sodium or potassium silicates.

11. The process according to claim 3, wherein the third step precipitates between 0.2 and 1.5 wt-% of a hydrolyzable phosphorous compound, expressed as $P_2O_5$, in ratio to the titanium dioxide core and 0.2 to 1.5 wt-% of a hydrolyzable silica compound, expressed as $SiO_2$, in ratio to the titanium dioxide.

12. The process according to claim 3, wherein the third step is carried out at a pH between about 6 and about 9.

13. The process according to claim 3, wherein the fourth step precipitates a layer of aluminum from a hydrolyzable aluminum compound.

14. The process according to claim 3, wherein the fourth step precipitates between 2.5 and 5 wt-% of a hydrolyzable aluminum compound, expressed as $Al_2O_3$, in ratio to the titanium dioxide core.

15. The pigment of claim 1 or claim 2 obtained using the process of treating the surface of a titanium dioxide pigment comprising the steps of:

forming an aqueous suspension of titanium dioxide pigment, in a first step, precipitating a layer of zirconium hydroxide or oxyhydroxide on the surface of the pigment, in a second step, precipitating a layer of titanium hydroxide or oxyhydroxide on the surface of the pigment, in a third step, precipitating a layer of phosphate and silica coprecipitates on the surface of the pigment, in a fourth step, precipitating a layer of aluminum oxyhydroxide on the surface of the pigment, recovering the pigment from the suspension.

16. The process of claim 13, wherein the hydrolyzable aluminum compound is a basic hydroxylated aluminum salt.

* * * * *